(12) United States Patent
Barber

(10) Patent No.: US 6,169,222 B1
(45) Date of Patent: Jan. 2, 2001

(54) REMEDIATION OF SOIL POLLUTED WITH PHOSPHORUS-CONTAINING WASTES

(75) Inventor: James C. Barber, Florence, AL (US)

(73) Assignee: James C. Barber and Associates Inc., Florence, AL (US)

( * ) Notice: Under 35 U.S.C. 154(b), the term of this patent shall be extended for 0 days.

(21) Appl. No.: 09/332,115

(22) Filed: Jun. 14, 1999

(51) Int. Cl.$^7$ .................................................. C01B 25/00
(52) U.S. Cl. .................... 588/244; 588/245; 588/246; 423/299; 423/322; 423/323
(58) Field of Search .................... 423/299, 322, 423/323; 588/244, 245, 246

(56) References Cited

U.S. PATENT DOCUMENTS 4,670,240 * 6/1987 Barber .................................. 423/322
5,549,878 * 8/1996 Barber .................................. 423/322

* cited by examiner

Primary Examiner—Steven P. Griffin
Assistant Examiner—Eileen E. Nave

(74) Attorney, Agent, or Firm—James H. Knebel

(57) ABSTRACT

Elemental phosphorus was produced by the Tennessee Valley Authority (TVA) at Muscle Shoals, Ala. by smelting phosphatic material with carbon in electric furnaces. Solid wastes containing elemental phosphorus accumulated at the production facility as a result of TVA's operation at Muscle Shoals. Soil became polluted with elemental phosphorus from contact with phosphorus-containing wastes and remediation of the polluted soil is needed to restore land at the site to usefulness. The present invention entails agglomeration of the polluted soil by nodulizing to prepare feedstock for electric furnaces; reacting phosphoric acid with finely divided phosphate ore forming a porous, monolithic mass of monocalcium phosphate monohydrate; disintegrating the monolithic mass to form lumps; heating lumps to obtain anhydrous monocalcium phosphate; and simultaneous smelting of agglomerated soil and anhydrous monocalcium phosphate with carbon in an electric furnace. No residue of polluted soil remains but calcium silicate slag, ferrophosphorus, and carbon monoxide are produced when the polluted soil is smelted. Calcium silicate slag, ferrophosphorus, elemental phosphorus, and carbon monoxide are produced when anhydrous monocalcium phosphate is smelted.

9 Claims, 2 Drawing Sheets

REMEDIATION OF SOIL POLLUTED WITH PHOSPHORUS-CONTAINING WASTES

BACKGROUND OF THE INVENTION

The Tennessee Valley Authority (TVA) produced about 1.1 million tons of elemental phosphorus at the agency's facility at Muscle Shoals, Ala. The chemical was produced over a 40-year period beginning in 1936. TVA had to content with a hazardous waste problem because some of the phosphorus vapor condensed as phosphorus sludge which was comprised of water, inorganic solids and particles of elemental phosphorus. When the sludge contained as much as 60 percent elemental phosphorus, or more, it could be burned to produce impure phosphoric acid and this acid could be combined with phosphate ore to produce concentrated superphosphate fertilizer. However, some of the sludge contained less than 60 percent elemental phosphorus and it could not be used to produce the fertilizer. Elemental phosphorus in phosphorus sludge is not completely oxidized when the sludge contains less than 60 percent elemental phosphorus. The lower oxides, such as $P_2O_3$, are phytotoxic and can not be used for fertilizer. Phosphorus sludge accumulated at TVA's phosphorus production facility awaiting technology to recover the elemental phosphorus.

Concentrated superphosphate fertilizer was phased out by TVA during the latter part of the 1950's and the agency developed processes to produce liquid fertilizers which were produced in demonstration-scale units operated by TVA. The impure phosphoric acid obtained by burning sludge was unsuited for production of clear liquid fertilizers, furthermore, highly concentrated phosphoric acid needed for liquid fertilizers could not be made by burning phosphorus sludge.

Elemental phosphorus is normally produced by smelting the mineral fluroapatite in electric furnaces. Temperatures in the electric furnaces are in the range of 2700 to 2800° F., and these high temperatures caused silicon tetrafluoride ($SiF_4$) to be volatilized. The furnace gases are cooled by contacting them with water and silica precipitates as indicated by the following equation.

$$3SiF_4 + 2H_2O = 2H_2SiF_6 + SiO_2.$$

The precipitated $SiO_2$ is a gel-like material and it contributes to the formation of phosphorus sludge.

Some inorganic solids volatilize from the electric furnace because of the high smelting temperatures. The volatilized solids condense in the furnace gas forming small particles which are dispersed as colloids in the gas stream by a phenomenon similar to cooling water vapor in the atmosphere to form fog. Some phosphorus vapor condenses as small particles of elemental phosphorus. The dispersion of inorganic materials and small particles of elemental phosphorus in water, an immiscible liquid, together with precipitated $SiO_2$, gives rise to the formation of the emulsion called phosphorus sludge.

Furnace gas is cooled by contacting it with water in a condenser. Since some of the phosphorus vapor condenses as small particles the water will contain colloidal particles of elemental phosphorus and a small quantity of the chemical is dissolved in the water. Furthermore, paticles of elemental phosphorus may be large enough for separation by settling. Water containing either dissolved phosphorus, colloidal particles of phosphorus, or settleable particles is called phossy water.

In 1939 TVA was operating Nos. 1, 2, and 3 phosphorus furnaces when a newly constructed furnace—No. 4—was started. The No. 4 furnace was equipped with an electrostatic precipitator to collect inorganic particles in the furnace gas prior to the condensation of the phosphorus vapor by contacting the furnace gas with water. Nos. 1, 2, and 3 furnaces were later retrofitted with electrostatic precipitators, and furnace Nos. 5, 6, and 7 were constructed later and they were equipped with precipitators. The proportion of elemental phosphorus that was recovered as phosphorus sludge was reduced by about half when electrostatic precipitators were used to clean the furnace gas.

Particulates collected by the electrostatic precipitators was called precipitator dust. The dust was gray, extremely fine-grained material mixed with fragments (about 1 mm in size) of coke, phosphate and slag. The bulk of the dust, however, consisted of inorganic materials that had volatilized from the furnace or had been entrained in the gas stream. These particles were approximately 2 microns or smaller in size, but inside the precipitator discrete particles aggregated into loose clusters up to 30 microns in size. Further aggregation into large lumps occurred when the dust was exposed to air.

Phosphorus vapor and carbon monoxide adsorbed on the surfaces of the inorganic materials and precipitator dust burned upon exposure to air. Elemental phosphorus content varied from not detectable to nearly 1.5 percent depending on the temperature of the dust. With the installation of precipitators, TVA had to contend with three phosphorus-containing wastes; they are phosphorus sludge, precipitator dust, and phossy water.

Dry precipitator dust was readily suspended in air and ingestion of the material by personnel was a serious industrial hygiene problem. To avoid the health hazard, precipitator dust was slurried with water inside the precipitator housing. However, contacting phosphorus-containing solids with water generates phossy water which is highly toxic to marine life. A few parts of elemental phosphorus per billion parts of water is sufficient to kill some species of marine life. Accordingly, precipitator dust slurry had to be dewatered before the solids could be stockpiled. Without dewatering phossy water would drain from the stockpiles and would be discharged into the Tennessee River causing fishkills.

Precipitator dust slurry was dewatered by pumping the slurry to one of two areas where the phossy water was allowed to drain from the wet solids. Dikes were constructed using granulated calcium silicate slag to prevent the discharge of phossy water. Phossy water that separated from the solids was pumped to a large mile of granulated slag where elemental phosphorus was removed prior to discharging the liquid as an aqueous waste. The dewatered precipitator dust was loaded into railroad cars and transported to an area nearby for stockpiling.

Soil in the dewatering areas was polluted with precipitator dust. The crane bucket used to load wet precipitator dust into railroad cars leaked because of the small particles and the soil around the dewatering areas became polluted. Soil under the precipitator dust piles is obviously polluted because no impermeable barrier was used to prevent contact between the dust and soil. Phosphorus sludge was stored in tanks, railroad cars, sumps and in a landfill. Soil under the landfill is obviously polluted with phosphorus sludge, A 14-acre settling pond was constructed to remove suspended particles of elemental phosphorus in phossy water. Particles of yellow phosphorus and particles of phosphorus sludge that were in phossy water settled out and have accumulated in the settling pond. Soil under the accumulations in the settling pond is polluted with elemental phosphorus and phosphorus sludge. The present patent application discloses a process to remediate the polluted soil and thereby restore the land to full usefulness.

DISCLOSURES IN THE INVENTION

TVA investigated the smelting of phosphatic materials in the laboratory, in pilot plants, and engineering tests and studies were carried out on production units. The results of TVA's research and development has been compiled and reported in publications such as, "Production of Elemental Phosphorus by the Electric Furnace Method", Tennessee Valley Authority, Chemical Engineering Report No. 3, 1952, Burt, R. B. and Barber, J. C. This report and similar publications provide a compendium of technical information to draw on for the development of processes to remediate phosphorus-containing wastes and to remediate polluted soil.

Electric furnace smelting of phosphatic materials to produce elemental phosphorus began with British patent No. 14,962 which was issued Oct. 18, 1888. The inventor was James Burgess Readman. A 60-kw electric furnace was constructed in England in 1890 and Readman was granted U.S. Pat. No. 417,943 on Dec. 24, 1889. Production of elemental phosphorus by the electric-furnace method began in the United States in 1889 when a single phase 50-kw furnace was constructed at Niagara Falls, N.Y.

The following specification from U.S. Pat. No. 417,943 is noteworthy because it provides information on the technology available to smelt phosphatic material prior to the invention of electric furnace.

In the ordinary method of obtaining phosphorus it is customary to heat the selected and prepared phosphatic material to a high temperature in fire-clay or earthenware cylinders or retorts by means of an external fire consuming solid or gaseous carbonaceous fuel. The material introduced into the retorts is generally a desiccated mixture of crude phosphoric acid or acid phosphate of lime intimately mixed when in solution with charcoal, coke, or other carbonaceous substance. Sometimes other substances containing phosphorus in combination with a metal or base are employed; but in such cases it is frequently necessary to use, in conjunction with the carbonaceous material, silica or other acid or basic matter or salts in order to liberate the phosphorus. The cylinders or retorts are connected with condensers, and when the necessary temperature has been attained phosphorus distills over and is condensed under water. The very high temperature which has to be employed to effect complete reduction and liberation of phosphorus occasions excessive wear and breakage of the fire-clay cylinders or retorts, leading to great loss of material and largely increasing the cost of production.

My invention [U.S. Pat. No. 417,943] has for its object to diminish the wear of the apparatus and the waste and loss of materials, and in carrying out my invention, instead of applying heat to the external surface of vessels containing the phosphorus-yielding material mixed, as usual, with carbonaceous matter, I generate the heat within the containing-vessel and apply it directly into and through the materials themselves, at the same time maintaining a reducing atmosphere within the vessel and keeping up the temperature required for the decomposition without introducing oxidizing, reducing, or other gases.

In order to accomplish my purpose, I employ a suitable adaptation of what is known as an "electric" furnace, such as is shown on the accompanying sheet of drawings. I do not, however, restrict myself to any precise construction of the electric furnace.

The following conclusions or deductions are drawn from the specification in U.S. Pat. No. 417,943.

1. Prior to the invention of the electric-furnace method to produce elemental phosphorus, phosphatic materials were smelted in fire-clay cylinders or retorts.

Breakage of the cylinders or retorts and loss of phosphatic material provided incentive for the process to produce elemental phosphorus by the electric-furnace method.

2. It is likely the "desiccated crude phosphoric acid" smelted was pyrophosphoric acid ($H_4P_2O_7$) or metaphosphoric acid ($HPO_3$) obtained by evaporation of water in orthophosphoric acid. The "acid phosphate of lime" was anhydrous monocalcium phosphate [$CaH_4(PO_4)_2$]. Since mineral fluorapatite was not included as a phosphatic material smelted it is assumed the fire-clay cylinders or retorts would not withstand the high temperatures required for the reduction of mineral fluorapatite.

3. The objective of Readman's invention was to reduce the phosphatic material by applying the heat inside the vessel. When the phosphatic material was heated in fire-clay or earthenware cylinder Readman was limited to smelting easy to reduce phosphatic materials. Mineral fluorapatite is difficult to smelt and the invention of the electric furnace permitted this phosphatic material to be smelted.

When TVA undertook production of elemental phosphorus the phosphatic material normally smelted was the mineral fluorapatite instead of a desiccated mixture of crude phosphoric acid or the acid phosphate of lime. Fluorapatite has the formula $Ca_{10}(PO_4)_6F_2$, but nearly all phosphate ores contain fluorapatite in a modified form whereby carbonate and fluoride are substituted for phosphate, and some calcium is replaced by other metals. Unsubstituted fluorapatite contains 3.77 percent fluorine, 42.2 percent $P_2O_5$, and the weight ratio of $F/P_2O_5$ is 0.089. In most phosphate ores the $F/P_2O_5$ weight ratio is significantly higher than it is in fluorapatite. Part of the phosphate normally present in the mineral has been replaced by carbonate and fluorine.

At first TVA undertook to smelt plate brown rock that was mined in middle Tennessee. The phosphate contained 3.5 percent fluorine, 32.8 percent $P_2O_5$, and the $F/P_2O_5$ weight ratio was 0.107. In the course of handling and drying this lump phosphate, it was expected no more than 25 percent would disintegrate into small particles, or fines, and the fines could be used to produce concentrated superphosphate fertilizer. But the quantity of fines exceeded that needed to make concentrated superphosphate fertilizer. Furthermore, the supply of plate brown rock in the middle Tennessee deposits was inadequate to meet TVA's needs for production of elemental phosphorus.

Fluorapatite mineral also occurs as a matrix whereby phosphate grains are embedded in clay and silica is a major constituent. Technology was available to beneficiate the phosphate ore by washing to remove most of the clay and prepare a phosphatic concentrate called washed sand which was comprised of flourapatite particles too small to be smelted in electric furnaces. It was necessary to aggregate the washed sand to form agglomerates large enough to be fed to the furnaces. TVA prepared agglomerates by a process called nodulizing and in this process washed sand was heated to the point of incipient fusion. Molten clay remaining in the ore after washing was the binder needed for agglomeration.

The following was taken from Chemical Engineering Report No. 3, page (210) and it is a report on the operation of the electric furnaces with nodulized washed sand.

When the phosphate was nodulized or sintered, the moisture, sulfur, carbon dioxide, organic matter, and 35 to 40 percent of the fluorine were volatilized. [Nodules were agglomerated by heating in a rotary kiln; sinter was agglomerated by heating on a travelling grate.] Although the nodules and sinter were porous and their structures appeared to be somewhat weak, furnace operation with these materials was markedly superior to the operation with uncalcined phosphate feeds [for example, plate brown rock]. Furnace draft control was improved significantly when the nodules or sinter was fed; there was more uniform movement of charge in the furnace as a result of the absence of crusting and the minimum formation of fines. During tests at the original No. 2 furnace the furnace-gas temperatures were approximately 300° F. lower when nodules or sinter was used than they had been when uncalcined Tennessee phosphate (plate brown rock or brown rock) was fed. The electrical energy requirement was 10 to 15 percent less for nodulized feed than it was for uncalcined Tennessee phosphate; this was a result of the improved furnace operation and the higher grade of the nodulized material. A decrease in electrical energy requirement of this magnitude was not realized when sinter was fed because the sinter was prepared from a mixture of washed phosphate sand and matrix, and the $P_2O_5$ content of this material was lower than that of the nodules or uncalcined rock phosphate normally fed to the furnaces.

From TVA's operation it is evident nodulized washed sand was a satisfactory feedstock for the electric furnaces. A typical analyses of the agglomerated material is given in table 1.

TABLE 1

Analyses of Nodulized Washed Sand

| Constituent | Percent |
|---|---|
| Moisture | 0.0 |
| $P_2O_5$ | 27.5 |
| CaO | 39.0 |
| $SiO_2$ | 24.1 |
| $Fe_2O_3$ | 3.3 |
| $Al_2O_3$ | 4.2 |
| F | 2.2 |
| $K_2O$ | 0.8 |
| MgO | 0.3 |
| $MnO_2$ | 0.3 |
| $Na_2O$ | 0.6 |
| S | 0.0 |

After TVA had been producing elemental phosphorus for about 14 years grains of fluorapatite mineral in the matrix had become smaller. When the matrix was washed to remove clay loss of mineral fluorapatite in mud ponds was excessive. Furthermore, mud ponds polluted water courses and groundwater. Beneficiation of phosphate ore by washing was discontinued and a program was undertaken to produce elemental phosphorus from raw phosphate ore.

When the raw phosphate ore was nodulized incipient fusion was attained at a lower temperature than nodulizing washed sand. Excessive molten material in the nodulizing kins caused large balls and rings to form and the nodulizing temperature had to be decreased. With the lower nodulizing temperature only about 8 percent of the fluorine was volatilized. The volatilization of $SiF_4$ during smelting increased and this compound combined with water in the condensing system to form fluosilicic acid and gelatinous silica. Sodium and potassium fluosilicates precipitated as tenacious scales in pumps and spray nozzles. Water is normally recirculated at the condensers and it was necessary to bleed off a stream of the recirculating condenser water and add fresh water thereby preventing the concentration of fluorine from exceeding about 10 grams of F per liter. The recirculating condenser water that was bled off was phossy water and its discharge into water courses was an environmental hazard.

U.S. Pat. No. 4,451,277 is an invention to recover phossy water by incorporating the waste in orthophosphate suspension fertilizer. Although release of phossy water into water courses can now be avoided, U.S. Pat. No. 4,451,277 was issued May 29, 1984 after TVA had discontinued production of elemental phosphorus at Muscle Shoals. Nevertheless, precipitator dust and phosphorus sludge have $F/P_2O_5$ weight ratios greater than the 0.089 in unsubstituted fluorapatite mineral and the process to recover excess phossy water is available for the remediation of phosphorus-containing waste by smelting.

The $P_2O_5$ content of raw phosphate ore varied widely but much of it had a $P_2O_5$ content in the range of 22 to 25 percent. The smelting of low $P_2O_5$ content phosphatic material caused excessive pressure fluctuations, high furnace gas temperatures, and it was difficult to tap the slag. Florida pebble phosphate was available for smelting simultaneously with the raw phosphate. Florida pebble was essentially free of clay and it contained 31 to 32 percent $P_2O_5$. However, particles in Florida pebble were too small to be fed to the electric furnaces and an endeavor was made to agglomerate the phosphatic material by nodulizing. Incipient fusion was attained at a temperature somewhat higher than the temperature required for washed sand. Brick in the nodulizing kiln was severely damaged and it was clearly evident successful agglomeration of Florida pebble by nodulizing would require the addition of clay.

Tests at the electric furnaces showed that some Florida pebble could be smelted without agglomeration. It was found that up to 35 percent of to furnace feed could be Florida pebble but smelting of larger proportions would cause excessive pressure fluctuations and high gas temperature. Nevertheless, enough unagglomeratod Florida pebble could be smelted simultaneously with nodulized raw phosphate ore to permit the latter to be smelted for the production of elemental phosphorus.

Matrix was mined in Florida and it was beneficiated by washing and flotation to separate both clay and silica. The beneficiated ore was called flotation concentrate. Flotation concentrate was mixed with raw phosphate mined in Tennessee and the mixture was agglomerated by nodulizing. In this case the small particles of flotation concentrate were incorporated in the fused nodules and the nodulizing temperature was low enough to avoid severe damage to brick in the nodulizing kilns. Nodules consisting of raw phosphate and flotation concentrate could be smelted. However, flotation concentrate was costly and it bad to be used sparingly.

Clay soil such as that at Muscle Shoals, Ala. is difficult to remediate by in situ treatment. Research and development at TVA, together with the specification in U.S. Pat. No. 417,943, led to this invention of a process to remediate polluted soil by smelting. The process entails agglomeration of the polluted soil by nodulizing to prepare electric furnace feedstock.

The present invention further entails reacting phosphoric acid with finely ground phosphate just as concentrated superphosphate fertilizer is manufactured. Chemical reaction between phosphoric acid and fluorapatite results in the formation of monocalcium phosphate monohydrate. When the fluorapatite mineral is represented by $Ca_{10}P_6O_{24}F_2$ the equation for the formation of monocalcium phosphate monohydrate is as follows.

$$Ca_{10}P_6O_{24}F_2 + 14H_3PO_4 + 10H_2O = 10CaH_4(PO_4)_2 \cdot H_2O + 2HF$$

Phosphorus is monocalcium phosphate monohydrate is a nutrient and the compound is a fertilizer. Prior to the invention of the electric furnaces anhydrous monocalcium phosphate was reduced with carbon in externally heated earthenware cylinders or retorts to produce elemental phosphorus. The anhydrous form of monocalcium phosphate can be obtained by heating to 212° F. but the compound should be heated to 250° F. to assure complete vaporization of water.

Concentrated superphosphate is manufactured by reacting thermal phosphoric acid with finely ground phosphate ore. The thermal phosphoric acid is made by burning elemental phosphorus to obtain $P_2O_5$ and combining $P_2O_5$ with water to make phosphoric acid. A porous monolithic mass is formed which is reduced to small sized particles for storage and completion of the chemical reactions. Electric furnace feedstock can be prepared by reducing the monolithic mass to a size suitable for smelting in electric furnaces. The $P_2O_5$ content of concentrated superphosphate fertilizer is in the range 48 to 50 percent.

Feedstock prepared from polluted soil and feedstock prepared by reacting phosphoric acid with finely divided phosphatic material can be simultaneously smelted with carbon to produce various products. Clayey soil contains iron oxide which reacts with carbon in electric furnaces to form elemental iron and carbon monoxide as shown by the following equation.

$$Fe_2O_3 + 3C = 2Fe + 3CO.$$

Silica and other nonreducible metal oxides in polluted soil become constituents in calcium silicate slag.

Smelting anhydrous monocalcium phosphate with carbon produces elemental phosphorus and carbon monoxide as shown by the following equation.

$$2P_2O_5 + 10C = P_4 + 10CO$$

Elemental iron formed by reduction of $Fe_2O_3$ in polluted soil and by reduction of $Fe_2O_3$ in concentrated superphosphate combines with elemental phosphorus to form a mixture of iron phosphides called ferrophosphorus. Nonreducible metal oxides, including calcium oxide, become constituents in the calcium silicate slag. In summary, products made from remediation of polluted soil are calcium silicate slag, ferrophosphorus, elemental phosphorus, and carbon monoxide.

PRIOR ART

The Chemical Abstract Search Service was requested to search for technical literature on recovery of elemental phosphorus from phosphorus-containing wastes. Although 177 items were cited, the following 11 items have some relationship with the subject invention.

1. "Use of Slags Formed During Phosphoric Sludge Incineration in Cyclone Furnaces as a Binder During Production of Phosphorite Pellets" Shevchenko, N. P.; Ulanova, N. M.; Serazetdino, D. Z., Izv. Nats. Akad. Nauk Resp. Kaz, Ser. Kim. (1994), (3), 86–8. Use of phosphoric slags from cyclone furnaces as a binder for prepn. of phosphorite pellets for P manuf. was investigated. Addn. of 5–10% slag was optimum. Strength of resulting pellets was comparable or higher than that of the conventional pellets. According to decarbonation kinetics of phosphorite, the optimum calcining temp. was 900° compared to the conventional temp. of 1150–1200°.

2. "Removal of Elemental Phosphorus from Electric Furnace Sludges of Various Origins", Jefcoat, Irvin A.; Potluri, Sundeep, Environ. Prog. (1995), 14 (2), 84–7. A method developed at the University of Alabama eliminated the toxic and flammable characteristics of elemental P from byproduct sludges produced from operation of elec. furnaces at widely sepd. facilities. The removal process is 1st order with respect to elemental P concn. with a rate const. of 0.02/min. The residuals produced contained Cd, Cr, and Pb above the TCLP.

3. "Method for Recovering Yellow Phosphorus from phosphorated Mud", Li Xindle, Faming Zhuamli Shenqing Gongkdi Shuomingshu. Yellow P is recovered from P mud by extn. using $CS_2$. $CS_2$ and P mud are mixed in (1–1.5): 1, and P is extd. at ≦30° for 1–3 h into the org. phase. The org. phase is collected and distd. to recover $CS_2$ and P. The residue after extn. is treated with Ca $(OH)_2$ to produce P.

4. "Conversion of Precipitator Dust into Phosphorus Furnace Feedstock", Barber, James C., U.S. Pat. No. 4,968,499. The process for converting the precipitator dust obtained during the prodn. of elemental P into the feedstock for the submerged-arc elec, furnace comprises: (1) agglomerating the precipitator dust contg. elemental P by tumbling with a binder made by the reaction of $H_3PO_4$ with finely divided phosphate ore, (2) indurating agglomerates by heating at 220–1832° F., (3) scrubbing the gases discharged from the above 2 steps to obtain a scrubber effluent contg. F compds., particulates, and elemental P, (4) using the scrubber effluent as feedstock for the prodn. of suspension fertilizer, and (5) transporting indurated agglomerates from step (2) to a facility for the prodn. of elemental P in a submerged-arc elec. furnace.

5. "Phosphorus Recovery from Phosphorus Mud", Neild, Michael A.; Robbins, Basil N. Canadian Patent 1,267,267. The title process comprises (a) completely boiling off the water from the waste material, (b) boiling off yellow P from the waste material, and (c) boiling off residual P from the treated waste material. An inert gas, e.g., N, is blown through the waste material during stages a and b, and an $O_2$-contg. gas, e.g., air, is used in stage c to burn off the residual P. This method decreases the time required to process P mud to a safety disposable form.

6. "Recovery of Phosphorus from Sludges", Gol'dman, V. D.; Kovalev, V. N.; Smirnova, N. A.; Shabalina, V. P.; Fedorov, N. F.; Sevryugov, L. B.; Moskvitina, T. L., U.S.S.R., Otkrytiya, Izobret, 1989, (40), 118 To improve the yield of P and to facilitate the treatment of sludge contg. particles of size 10–20 μm, the sludge is contacted with a $SiO_2$-contg. hydrophilic sorbent having pores, 20–70% of which has a radius of 30–220 mm.

7. "Phosphorus Recovery from Phosphorus-Containing Byproducts", Finley, Joseph H.; Hall, Richard E., U.S. Pat. No. 4,783,328. P values from wet-acid raffinate and the nodule fines from an elec. P furnace are recovered as elemental P by forming into briquettes, heating the briquettes to curing temps., and charging the cured briquettes into the elec. P furnace in the presence of coke and a fluxing agent. Thus, a mixt. contg. 70 nodule fines and 30 wt. % burden dust was combined with a raffinate contg, 27.6 $P_2O_5$ anid 9.8 wt. % water. Pellets were prepd. at 4000 psi and cured at 200°. When tested, 27.6% of cured pellets contg. a raffinate binder were abraded as compared to 100% of cured pellets without a raffinate binder.

8. "Recovery of Phosphorus and Precipitants (iron) from Post-Precipitation Sludge", Ripl, Wilhelm; Stammert, Brigitte; Wiesman, Udo; Karimia, Massoud; Von Wasser (1988), 70, 179–85. A recycling process of post-pptn. sludge was used to recover P as Ca phosphate (tech. quality) and Fe as pptn. agent and to sep. heavy metals as sulfides. This recovery process will be favorable for the use of efficient post-pptn processes for P elimination. In the 1st step of the process, the sludge was treated with $H_2S$, and 99% of the P was redissolved by the transformation of phosphates to sulfides. In the 2nd process step, the sulfide-contg. sludge was treated with HCl, and 80% of the Fe was recovered, while $\geq$90% of heavy metals (Cu.Pb) were retained in the remaining sludge.

9. "recovery of Phosphorus from Waste Mud from Electrothermal Phosphorus Production", Nield, Michael A.; Robbins, Basil N., U.S. Pat. No. 4,762,697. The title process consists of heating the mud to boil off water wnd then to boil off yellow P, which is subsequently condensed. The residual P is then removed mainly by burning off in air along with some volatilization, to increase the recovery rate of solids from the waste material compared to removal of residual P by volatilization under N. A significant improvement in processing rate is achieved at the expense of a minor loss of recoverable P. A charge of 1327 kg mud of compn. water 61, P 30, and solids 9% was placed in a mud still and heated under flowing N to distill water over the 1st h. Distn. of P followed, peaking after 1.9 h., then decreasing and remaining steady after 3.3 h., at which point the N flow was replaced with a flow of air. After 30 min of air flow heating was discontinued; the still contents rose steadily for 2 h. The condenser off-gas gradually lost its green phosphorescence, which was replaced by a flow of white $H_3PO_4$ mist in N; after 4 h. the off-gas contained 4% 0. After a total of 7.4 h. processing, 120 kg P-free solid residue remained; the residue recovery rate was 162.2 kg/h and 7% of the recoverable P was lost as $P_2O_5$.

10. Phosphorus Recovery from Phosphorus-Containing Pond Sludge, Beck, Steven M., Cook, Edward H. Jr., U.S. Pat. No. 4,717,558.

The title process, for P recovery from sludge contg. 5–70 wt. % P, consists of mixing the sludge with addnl. water and heating with mild agitation at 165–212° F. for $\geq$0.5 h. to increase the P concn. in the sludge without compositional layering. The concd. sludge settles, and is washed with water at 130–150° F., the steps are repeated, and the sludge is recovered. Sludge 595 g, contg. elemental P 21.9, dirt 19.2, and water 48.9%, was treated with addnl. water 1200 g and heated at 169° F. with mild agitation for −90 min., after which the sludge was allowed to settle and give a bottom layer contg. P 84.4, dirt 3.3, and water 12.3%. The sludge was sparged with hot (135° F.) water at 2 L/h with continuous overflow to give, after 2 h. 160 g material of compn. P 79.4, dirt 1.8, and water 18.8%, i.e. −97.5% P recovery.

11. "Recovery of Phosphorus from Waste Ponds", Crea, David A. U.S. Pat. No. 4,492,627. Process for recovery of elemental phosphorus from waste ponds by dredging the waste pond to obtain an aqueous phosphorus slurry, separating particles larger than 2 mm from the slurry, treating the remaining slurry in an initial hydrocyclone and removing an overflow of solids larger than 500 micrometers, treating the underflow from the initial hydroclones in smaller diameter hydrocyclones, removing a second overflow enriched in slimes and diminished in phosphorus, removing a second underflow enriched in phosphorus and diminished in slimes and heating it sufficiently to melt the phosphorus therein, treating the heated second underflow in a centrifugal separator, and separating and recovering a stream of coalesced phosphorus from a heavy fraction of impurities.

The Chemical Abstract Search Service was requested to search the technical literature for items on remediation of soil polluted with elemental phosphorus and radionuclides. Two references were cited but one of the references, "Comparison of U.S. and Foreign Test Protocols on Stabilized Hazardous Wastes", Conner, Jesse, R. and Huffman, James M., Proceedings, Annual Meeting, Air and Waste Management Association, provided no information on remediation of contaminated soil. The other reference was, "First Remediation of an Industrial Site in Bitterfeld", Neef, Uwe; Bergman, Volker; Bohme, Peter; Duresh, Rolf; Kotte, Gerhard, Brach, Flaechen. Recycling (1998), 5 (1), 43–50. A brief abstract is as follows.

Depending on the contamination degree, various methods were employed for P removal from soil, including phys. removal with steam and oxidn. with $H_2O_2$. All the treatments were performed on excavated material.

Additional prior art merits including in the present application.

1. "Agglomerating Fine Phosphate Rock"Curtis, Harry A. U.S. Pat. No. 2,040,081, May 12, 1936.

Two claims in patent are as follows.
    1. Process of agglomerating fine phosphate rock, which comprises, pugging 100 parts by weight of the fine phosphate rock and 8 to 14 parts by weight of sulfuric acid, containing 30 to 50% by weight of $H_2SO_4$, and discharging the mixture into a rotary drier to form spheroidal masses and to dry the masses.
    2. Process of agglomerating fine phosphate rock which comprises pugging 100 parts by weight of the fine phosphate rock and 6 to 8 parts by weight of phosphoric acid containing 25 to 40% by weight of $H_3PO_4$; and discharging the mixture into a rotary drier to form spheroidal masses and to dry the masses.

The process was invented by a TVA staff member and the patent was assigned to TVA. However, TVA did not use the process disclosed in U.S. Pat. No. 2,040,081. Nodulized washed sand was a satisfactory feedstock for the electric furnaces as reported in Chemical Engineering Report No. 3. Although monocalcium phosphate monohydrate was formed by reactions between acids and fine phosphate rock in both claims 1 and 2, there was little incentive to prepare feedstock containing this easy-to-reduce phosphatic material.

2. "Method for the manufacture of Superphosphate" Harvey, Stewart A, and Bridger, Grover L., U.S. Pat. No. 2,528,514, Nov. 7, 1950.

The invention is a method to prepare monocalcium phosphate monohydrate in the cone mixer shown in FIG. 2. The cone mixer was used by TVA to produce concentrated superphosphate and it was used in the fertilizer industry to produce concentrated superphosphate and normal superphosphate. Normal superphosphate is produced by reacting sulfuric acid with finely ground phosphate ore.

The following statement about the cone mixer is from page 143 in the book "Superphosphate: Its History, Chemistry, and Manufacture", United States Department of Agriculture and the Tennessee Valley Authority. The book was issued in December 1964.

One modern development in superphosphate mixing is use of the cone mixer, developed initially for concentrated superphosphate manufacture and later adapted to normal superphosphate. The cone mixer has no moving parts; all the mixing is accomplished by the swirling action of the acid and rock streams in the cone. In a typical mixer rock dust falls through the feed pipe and impinges on the deflector, a small inverted closed-bottom cone. The latter deflects and distributes the dust around the cone at a level just below the acid injection point. The acid enters tangentially through four nozzles on the inside surface of the cone, and water is added through two similar nozzles. A fairly high acid velocity is used to form a swirling film over the lower cone surface. The dust impinges on this film and the two streams become mixed rapidly. The cone has an outlet extension to prevent the slurry from spraying out over a large area as it is discharged. Moreover, it has been found that the extension plays an important part in getting good mixing efficiency and high capacities.

3. "Process For The Production of Elemental Phosphorus and Iron from Phosphate Rock" Majewski, Edward Adam, U.S. Pat. No. 4,014,682, Mar. 29, 1977.

An abstract of the invention is as follows.

A process for the production of phosphorus from low-grade phosphate rock containing at least 5% by weight of each iron and aluminum (calculated as their oxides) by heating a mixture of the rock, calcium oxide and a carbonaceous reductant in a reaction chamber at a temperature of at least 1400° C. to produce molten reaction products containing ferrophosphorus and a calcium aluminate slag which is liquid at the reaction temperature, and gaseous reaction products containing elemental phosphorus. The gaseous reaction products are withdrawn from the reaction chamber and elemental phosphorus is recovered therefrom. The ferrophosphorus is separated from the liquid calcium aluminate slag and subjected to an oxidizing treatment in the presence of calcium-containing material to produce metallic iron and calcium phosphate. Calcium phosphate thus produced is recycled to the reaction chamber.

4. "Process For Agglomerating Carbon Particles", Barber, James C., U.S. Pat. No. 4,421,521, Dec. 20, 1983.

An abstract of the invention is as follows.

A process and product of waste recovery at phosphorus furnaces is disclosed wherein small sized discrete particles of carbonaceous material or beneficiated phosphate ore are mixed with a mineral acid, an alkaline fluid, and water, and the reacted mixture is tumbled in a horizontal cylinder at a temperature below that at which carbonaceous material oxidizes to form agglomerates which are then indurated to discrete particulate size as desired for a charge component; the agglomerates are fed to phosphorus smelting furnace together with other materials needed to make elemental phosphorus; furnace gases are cooled with recirculating water, a side stream of the water is taken off, treated, and used as feedstock in fluid fertilizers. Apparatus is disclosed for agglomerating coke and phosphate and, further, for measuring the abrasion and shatter resistance of agglomerates.

5. "Phosphate Feed Material For Phosphorus Electric Furnace" Finley, Joseph H., U.S. Pat. No. 4,806,326, Feb. 21, 1989.

An abstract of the invention is as follows.

Nodule fines formed by abrasion of electric furnace feed materials of phosphate shale nodules, are utilized by mixing a recycle stream of the nodule fines with fresh phosphate in the presence of phosphoric acid prior to forming the shale into nodules. The phosphoric acid prevents loss in mechanical strength of the nodule caused by a mixture with the nodule fines.

6. "Phosphate Feed Material For Phosphorus Electric Furnaces And Production of Same", Finley, Joseph H., Hammermeister, Lewis L. and Sproul, Jared S., U.S. Pat. No. 4,822,583, Apr. 18, 1989.

An abstract of the invention is as follows.

Compacted shapes of phosphatic material, suitable as a charge for a phosphorus furnace, are produced by compacting a mixture of calcined phosphate fines and phosphoric acid. The compacted shapes are conveniently produced on a roll briquetting press.

DETAILED DESCRIPTION OF THE INVENTION

Figure 1:
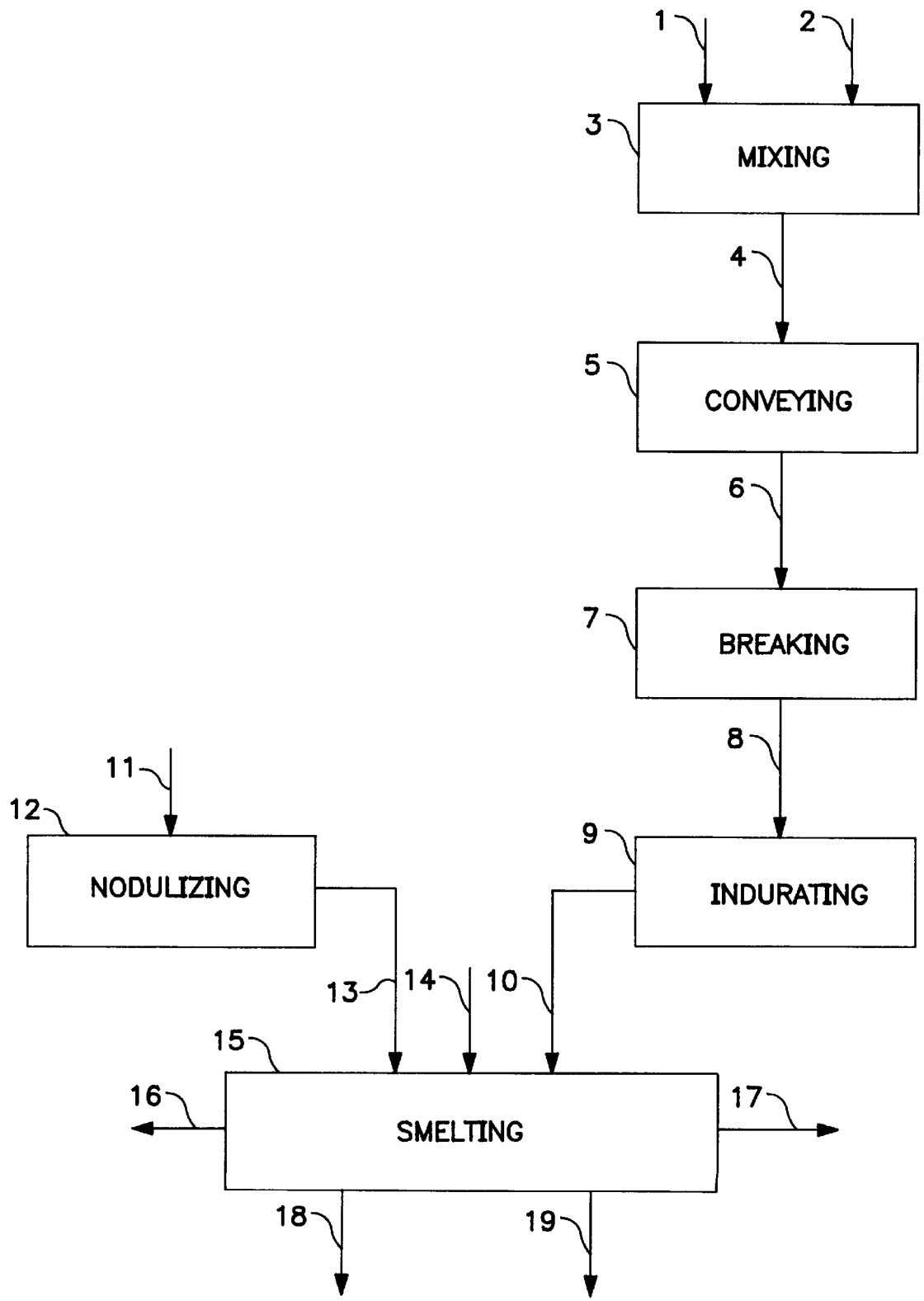
FIG. 1 is a schematic representation of the process of this invention.

FIG. 1 is a diagram of the process for remediation of polluted soil. In the drawing 1 is phosphoric acid and 2 is ground phosphate. The two materials combine in cone mixer 3 to form slurry 4. Reaction between phosphoric acid 1 and ground phosphate 2 continues in conveyors forming monolithic mass 6. Monolithic mass is broken by breaker 7 forming lumps 8. Lumps are heated to complete reaction between phosphoric acid and ground phosphate simultaneously indurating lumps in indurator 9. Hardened lumps 10 are fed to electric furnace 15.

Polluted soil 11 is nodulized in nodulizing kiln 12 forming nodules 13. Nodules 13, coke 14, and indurated lumps 10 are smelted in electric furnace 15. Carbon monoxide 16, slag 18, and fetrophosphorus 19 are byproducts obtained by smelting nodules 13, coke 14, and indurated lumps 10. Elemental phosphorus 17 is the primary product obtained by smelting nodules 13, coke 14, and indurated lumps 10.

Figure 2:
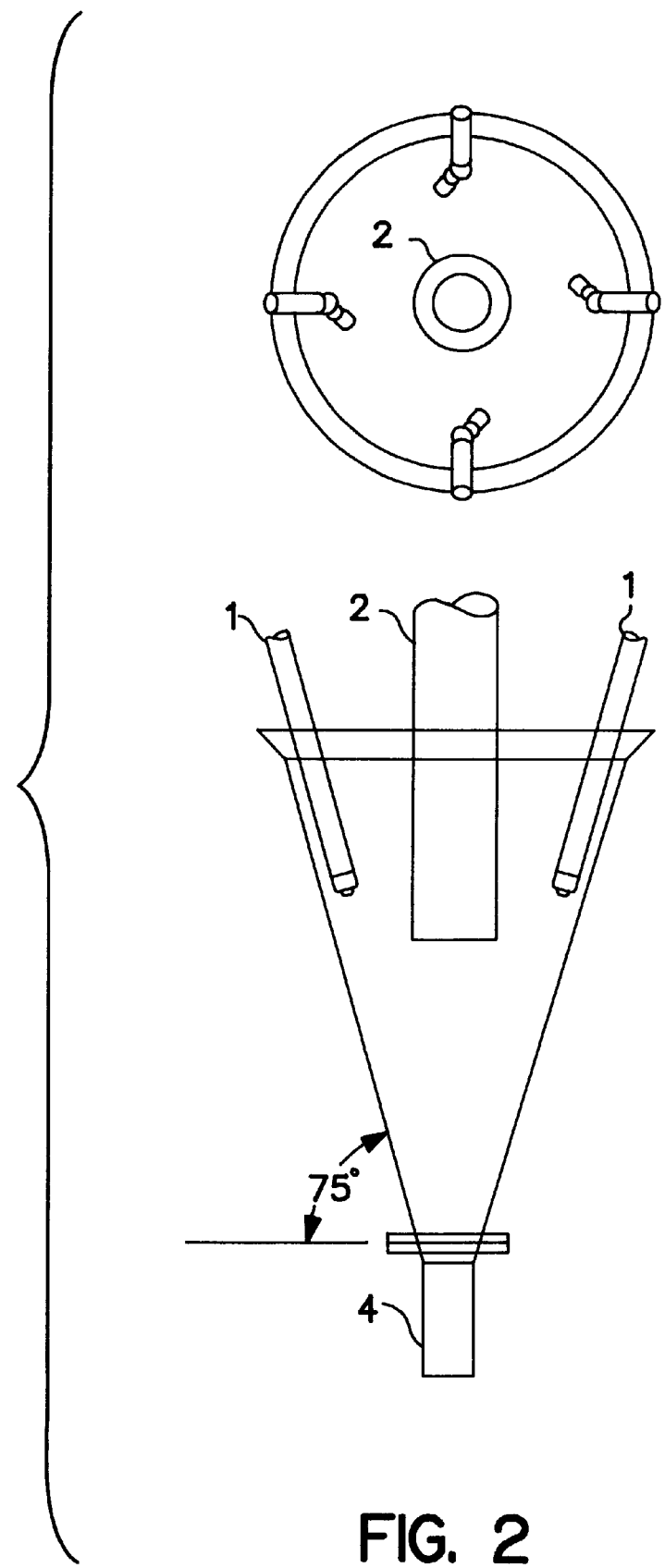
FIG. 2 is a top and side view of a cone mixer that may be employed in the practice of this invention.

FIG. 2 is a drawing of a cone mixer used by TVA to produce concentrated superphosphate fertilizer. The following is a description of mixer and discussion of the operation given in, "Development of Processes For Production of Concentrated Superphosphate", Bridger, G. L., Chemical Engineering Report No. 5, 1949.

The mixer consisted of an inverted, truncated cone to which was attached a cylindrical extension at the bottom. Acid was introduced to the mixer through four 1-inch pipes 1 spaced equidistant around the perimeter of the mixer. These pipes rested flat against the mixer wall and were adjustable, but normally they extended about 6 inches below the rim of the mixer. To each pipe was attached a 45-degree ell in which was fitted a standard ¾-inch pipe nipple serving as a nozzle. Fishtail-type nozzles were tried, but since no improvement in mixing was obtained, their use was discontinued. The nipples were turned flat against the mixer wall, and they imparted to the acid a swirling motion along the side of the mixer.

Rock [ground phosphate] was introduced into the center of the mixer bowl through a vertical spout 2 extending to a level just below the acid nozzles. The rock fell into the vortex created by the tangential introduction of the acid to the mixer. The fluid level was slightly above the mixer discharge extension 4, which was completely full at all times. The acid and rock appeared to be thoroughly mixed as they discharged from the mixer, and there was further opportunity for mixing on the belt conveyor receiving the effluent because of the turbulence there. There was no build-up of superphosphate in the bowl as there was in the earlier unit in which rock was introduced at the side of the mixer. Rock distributors were also tried with the vertical spout in an effort to distribute the rock evenly around the periphery of the mixer. This also resulted in rock penetration of the acid film, causing a build-up of solid superphosphate in the mixer. Introduction of the rock into the vortex of the acid was found to give the best operation and resulted in thorough mixing when a sufficient holdup of fluid superphosphate in the mixer bowl was maintained. Under test operating conditions at 30 tons of superphospate per hour the retention time in the mixer is estimated to be 2 seconds, with a 2½-inch diameter extension.

OBJECTS OF THE INVENTION

Although TVA discontinued production of elemental phosphorus in 1976, accumulations of precipitator dust and phosphorus sludge remain at the site. TVA is evaluating U.S. Pat. No. 4,968,499, "Conversion of Precipitator Dust into Phosphorus Furnace Feedstock" and it is possible a plan will be forthcoming for the remediation of accumulations of precipitator dust and phosphorus sludge. However, patented technology to remediate polluted soil has not been offered to TVA. The primary objective is to provide an invention to remediate polluted soil and thereby enable TVA to restore land to usefulness.

The accumulation of precipitator dust will be smelted in an existing electric furnace in a way that will demonstrate elemental phosphorus can be produced from the waste. This demonstration is expected to encourage investment in an electric furnace to smelt TVA's phosphorus sludge and to smelt accumulations of phosphorus-containing wastes at other sites. Another object of the invention is to remediate polluted soil by smelting a mixture of phosphatic material and soil in an electric furnace. Inorganic constituents in the soil will be incorporated in calcium silicate slag, and the slag will be a byproduct which can be applied on agricultural land.

EXAMPLE I

A definition of "soil polluted with elemental phosphorus" should be established in the initial example. For the lower limit of the concentration of elemental phosphorus, consideration should be given to the toxicity of the element in a marine environment. The following abstract of a publication, "Yellow Phosphorus Pollution: Its Toxicity to Seawater-Maintained Brook Trout (*Salvelinus fontinalis*) and Smelt (*Osmerus mordax*)", Fletcher, G. L., Hoyle, R. J., and Horne, D. A., J. Fish. Res. Bd., Canada 27:1379–1384, 1970, demonstrates elemental phosphorus is a highly toxic chemical.

Yellow phosphorus was lethal to seawater-maintained brook trout and smelt at concentrations as low as 0.5 $\mu$g/liter. Trout that were exposed to low concentrations of yellow phosphorus (0.5 and 7.9 $\mu$g liter) for 50 hours or more turned red and showed signs of extensive hemolysis. At death, all trout that had been exposed to 104 $\mu$g/liter yellow phosphorus and lower had hematocrits that were significantly lower than those of the controls.

Based on the above abstract it is evident very small concentrations of elemental phosphorus in water will kill fish. Water in the Tennessee River and ground water at TVA are subject to pollution. In order to protect the river and ground water, soil containing detectable concentrations of elemental phosphorus should be remediated.

The present invention entails agglomeration of polluted soil by heating to high temperatures. The elemental phosphorus will be oxidized to $P_2O_5$ during agglomeration and the oxide will be discharged in the exhaust gases. Remediation of soil containing more than about 0.3 percent elemental phosphorus may cause an air pollution problem. Furthermore, elemental phosphorus is a valuable chemical and soil containing more that 0.3 percent elemental phosphorus should be processed by methods that recover elemental phosphorus.

Soil polluted by elemental phosphorus is defined, therefore, as soil containing detectable concentrations of elemental phosphorus as determined by gas chromatography up to 0.3 percent of the element.

EXAMPLE II

TVA's production of concentrated superphosphate fertilizer providers a precedent for the present invention. The fertilizer was also called "double superphosphate", "triple superphosphate", and "treble superphosphate". The fertilizer was made by reacting phosphoric acid with ground phosphate ore. The principal phosphatic constituent in the fertilizer is monocalcium phosphate monohydrate. The objective in the manufacture of concentrated superphosphate was to convert the $P_2O_5$ in the phosphate ore into a soluble form needed to grow crops.

Dried phosphate ore containing about 32 percent $P_2O_5$ was dried and then ground so that about 80 percent was smaller than 200 mesh. Phosphoric acid (usually in the range 74 to 78 percent $H_3PO_4$) and the ground phosphate were mixed in the cone mixer shown in FIG. 2. The mixture then underwent three distinct stages of physical characteristics. In the first stage the mixture was fluid and easily mixed, in the second stage the mixture was plastic and was mixed only with much difficulty, and in the third stage the mixture became relatively dry and was a porous monolithic mass. A slurry formed in the cone mixer was immediately discharged onto a belt conveyor for progressing to the second and third stages.

The center line of the cone mixer was approximately 6 feet from the center line of the tail pulley of the conveyor belt which was 36 inches wide and 37 feet between the center lines of the head and tail pulleys. The belt traveled at a speed of 42.5 feet per minute and this provided a 45-second retention time. With these dimension and speed of the conveyor belt and with the cone mixer shown in FIG. 2, the production rate was 40 to 42 tons per hour of concentrated superphosphate.

A series of knives cut the monolithic mass into narrow ribbons about 1.5 inches wide. A squirrel-cage-type rotary disintegrator mounted above the head pulley shredded the mass of material as it was discharged from the conveyor belt. The fresh material discharging from the mixer belt had a characteristic honeycomb structure. Disintegration of the mass resulted in the formation of considerable fines, depending on the mixing conditions, and practically complete elimination of lumps over 2 inches in size.

The freshly mixed material was stored in piles inside a building for two to three months for further reaction between the acid and ground phosphate, called curing. The concentrated superphosphate would be set up and would require blasting to break up the material. The cured superphosphate was disintegrated and screened through a 4-mesh screen. Typical analysis of concentrated superphosphate fertilizer prepared from Tennessee phosphate ore (32 percent $P_2O_5$) are given in table 1.

TABLE 2

Analysis of Concentrated Superphosphate

|  | Concentration of phosphoric acid, percent $H_3PO_4$ | |
| --- | --- | --- |
|  | 75 | 78 |
| Acidulation, $P_2O_5$/CaO mole ratio | 0.98 | 0.98 |
| Composition, % |  |  |
| Total $P_2O_5$ | 48.5 | 49.1 |
| Available $P_2O_5$[a] | 47.5 | 47.9 |
| Free acid $P_2O_5$[b] | 2.0 | 1.5 |
| Moisture[c] | 5.1 | 3.4 |
| Conversion, %[d] | 93 | 91 |

[a]$P_2O_5$ available for plant uptake as determined by laboratory procedures adopted by the Association of Official Agricultural Chemists (A.O.A.C.).
[b]Free acid was determined by titration of an acetone extract and free acid is expressed as percent $P_2O_5$
[c]Moisture was determined by drying over concentrated sulfuric acid for 48 hours in an evacuated desiccator at room temperature.
[d]Percentage of phosphate ore $P_2O_5$ converted to the available form.

EXAMPLE III

Concentrated superphosphate made by storing the freshly mixed, or green, material was a satisfactory product and nearly 2 million tons was produced by TVA over the period 1935–1960. Granular, quick-cured superphosphate, made by heating the green material, appeared to be a better product for TVA and the agency undertook experimentation in the laboratory and in pilot plants to make this fertilizer.

Chemical handbooks give the formulas for monocalcium phosphate monohydrate to be $CaH_4(PO_4)_2 \cdot H_2O$. But the compound can be represented by the formula $CaO \cdot P_2O_5 \cdot 3 H_2O$.

Concentrated superphosphate is prepared by reacting aqueous phosphoric acid with ground phosphate ore and both the green and storage-cured material contains moisture. Heating green, concentrated superphosphate will volatilize moisture and one objective of TVA's experimentation was to prevent caking in paper bags by heating the green superphosphate to reduce the moisture content. Plant experience with the storage-cured fertilizer had shown that the moisture content should be reduced to 3 percent if the material was stored in bags for long periods of time. A moisture content of 5 percent was acceptable if the fertilizer was to be stored in bags for short periods.

The following is from pages 118 and 120 (page 119 is a table), in "Development of Processes For Production of Concentrated Superphosphate", Bridger, G. L., Tennessee Valley Authority, Chemical Engineering Report No. 5, 1949.

The present work showed that 3 days heating of monocalcium phosphate monohydrate at 392° F. drove off approximately 2 of the 3 molecules of water initially present in each molecule of the monohydrate. The loss of the final molecule of water in heating monocalcium phosphate monohydrate at 482° or 500° F. was slow, but the loss occurred rapidly at 572° F. At temperatures above 572° F., constancy of weight within 0.2 percent was attained in 8 to 12 hours heating. As the temperature was raised to 932° or 1292° F., the weight loss increased to a maximum of about 22.5 percent. Since the monocalcium phosphate monohydrate as analyzed contained 21.4 percent $H_2O$ (determined by difference), the loss in excess of this amount presumably represented volatilization of $P_2O_5$. Precise determinations of the $P_2O_5$ and CaO in products of dehydration showed that on the basis of the CaO balance, 1.0, 1.1 to 1.2 and 1.5 percent, respectively, of the $P_2O_5$ content of the monocalcium phosphate monohydrate was volatilized in prolonged heating at 482°, 680°, and 788° F. The $P_2O_5$ loss did not show a direct relationship to the time of heating.

Much experimentation was carried out at TVA drying green, concentrated superphosphate in the laboratory and in pilot plants. There was loss of available $P_2O_5$ when the fertilizer was heated enough to dry the fertilizer. Furthermore, free acid $P_2O_5$ was higher in quick-cured superphosphate than it was in the storage-cured fertilizer. Free acid $P_2O_5$ caused the paper bags to rot. It was evident, therefore, that compromises had to be made; drying temperature was lower than desired and the high conversion of $P_2O_5$ obtained with storage-cured superphosphate did not appear attainable. The recommended mixing conditions, curing conditions, and predicted characteristic of the product are given in table 3.

TABLE 3

Recommendations For Conditions For Operating A Rotory-Dryer Quick-Curing Plant
RECOMMENDATIONS

| Mixing conditions | |
| --- | --- |
| Phosphoric acid concentration | 68% |
| Phosphoric acid temperature | 100° F. |
| Acidulation ($P_2O_5$/CaO mole ratio) | 0.93 |
| Mixer | continuous |
| Mixer-belt retention time | 6 minutes |
| Disintegration of green superphosphate | battery of four squirrel-cage disintegrators |
| Curing conditions | |
| Rotary dryer with flights | direct fire continuous operation |
| Drier loading | 14% |
| Maximum gas velocity in dryer (actual conditions) | 5 ft./sec. |
| Dryer retention time | 2.8 hr. |
| Dryer inlet gas temperature | 220° F. |
| Predicted characteristics of product | |
| Moisture content | 3% |
| Conversion | 89% |
| Free acid $P_2O_5$ | <3% |
| Dryer data | |
| Product temperature | 150° F. |
| Dust loss from dryer | <7% (99% of dust loss from dryer recoverable in dust collector) |

EXAMPLE IV

TVA's production of storage-cured superphosphate fertilizer likely led to U.S. Pat. No. 2,040,081, "Agglomeration of Phosphate Rock". Claim 2 in the patent is as follows.

2. Process of agglomerating fine phosphate rock, which comprises, pugging 100 parts by weight of the fine phosphate rock and 6 to 8 parts by weight of phosphoric acid containing 25 to 40% by weight of $H_3PO_4$; and discharging the mixture into a rotary dryer to form spheroidal masses and to dry the masses.

Phosphoric acid and small sized phosphate ore were intimately mixed in a pug mill forming monocalcium phosphate monohydrate. The mass of material was discharged into a rotary dryer to make spheroidal masses and to dry the masses to the proper moisture content. Monocalcium phosphate monohydrate was the binder in the agglomeration process, although the binder was not identified in U.S. Pat. No. 2,040,081. Agglomerates formed in the dryer were indurated sufficiently to be suitable for smelting in electric furnaces.

EXAMPLE V

Independent claim 1 in U.S. Pat. 4,968,499, "Conversion of Precipitator Dust Into Phosphorus Furnace Feedstock" is as follows.

1. A process for the production of furnace feedstock, said process comprised of the following steps:
   (a) agglomerating precipitator dust containing elemental phosphorus by tumbling with a binder formed by reacting phosphoric acid with finely divided phosphate ore;
   (b) indurating agglomerates in step (a) by heating at a temperature of 220 to 1832 degrees F.;
   (c) scrubbing gases discharged from steps (a) and (b) thus obtaining a scrubber effluent containing fluorine compounds, particulates and elemental phosphorus;
   (d) using scrubber effluent from step (c) as feedstock for the production of suspension fertilizer; and
   (e) transporting indurated agglomerates from step (b) to a facility for the production of elemental phosphorus.

In step (a) phosphoric acid and finely divided phosphate ore can be mixed in the cone mixer shown in FIG. 2. When TVA produced concentrated superphosphate, the slurry formed in the cone mixer was discharged onto a conveyor belt to form a monolithic mass. In U.S. Pat. No. 4,968,499 phosphoric acid and finely divided phosphate ore react to form a slurry but the slurry and precipitator dust are tumbled to prepare agglomerates having a size suitable for smelting in electric furnaces.

In step (b), U.S. Pat. No. 4,968,499 agglomerates formed in step (a) are indurated by heating at a temperature in the range of 220 to 1832 degrees F. Claim 2 in U.S. Pat. No. 2,040,081 is a process for agglomeration of a pugged mixture of phosphoric acid and finely divided phosphate ore. The pugged mixture is discharged into a rotary dryer for tumbling to form the agglomerates and for drying the agglomerates.

EXAMPLE VI

A Russian article titled, "Use of Slags Formed During Phosphoric Sludge Incineration in Cyclone Furnaces as a Binder During Production of Phosphorite Pellets" listed under Prior Art. From the English abstract provided by the chemical Abstract Search Service it appeared the article would contribute information on the agglomeration of phosphate ore with calcium phosphate. The Russian article was translated into English.

The slag referred to in the title was residue obtained by burning phosphorus sludge in a cyclone furnace. The principal constituents of the soluble fraction were $P_2O_5$ at 52.08 percent and CaO at 7.62 percent. The insoluble fraction ($SiO_2$ and $SiP_2O_7$) was 31.5 percent. The $P_2O_5$/CaO mole ratio was 2.70 as compared with a $P_2O_5$/CaO mole ratio of approximately 1.0 for concentrated superphosphate.

The phosphate ore was a Karatan phosphorite from the Janatas deposit (phosphorus powder) containing 28.95 percent $P_2O_5$, 46.60 percent CaO, 14.31 percent $SiO_2$, 2,58 percent F, and smaller percentages of MgO, $Al_2O_3$, $Fe_2O_3$, $K_2O$, and $Na_2O$. The phosphate ore was ground to reduce the particle size to less than one millimeter.

The ground phosphate ore was agglomerated (pelletized) in laboratory equipment to obtain pellets with diameters in the range 10–20 mm. (0.39–0.79 inch). The moisture content of the green agglomerates was 7 percent and they had a crushing strength of about 3 kilograms (6.6 pounds). The addition of slag had no apparent effect on the strength. The green agglomerates were then dried for 30 minutes to 200° C. (392° F.) followed by calcining in a furnace at 900–1200° C. (1652–2192° F.). The crushing strengths of the indurated agglomerates are reported in table 4 taken from the Russian article.

TABLE 4

Strength Of The Calcined Granules (Pellets) As A Function Of The Amount Of Added Slag Of A Cyclone Furnace Of The Venture "Chimprom" And The Temperature Of Calcining

| Calcining temperature, ° C. | Strength of granules (pellets), kg | | | | |
|---|---|---|---|---|---|
| | without added slag | with added slag (wt. %) | | | |
| | | 3 | 5 | 8 | 10 |
| 900 (1652° F.) | 25 | 55 | 70 | 90 | 110 |
| 1000 (1832° F.) | 30 | 70 | 90 | 120 | 150 |
| 1100 (2012° F.) | 70 | 85 | 110 | 145 | 170 |
| 1200 (2192° F.) | 80 | 100 | 130 | 170 | 210 |

Although added slag did not significantly increase the strength of green agglomerates, calcined pellets were markedly stronger when slag was added. And the crushing strength of the calcined pellets increased with increasing percentages of slag. The important information obtained from the Russian article is that high resistance to crushing is maintained at calcining temperatures as high as 2192° F.

EXAMPLE VII

The chemical formula for monocalcium phosphate monohydrate can be represented by $CaO.P_2O_5.3 H_2O$ as explained in example III. However, the chemical contains moisture in addition to the three moles of combined water when it is prepared by reacting aqueous phosphoric acid with ground phosphate ore.

In the electric furnace some of the moisture vaporizes and is discharged in the furnace gases and some of the moisture is reduced forming carbon monoxide and hydrogen as shown by the following equation.

$$H_2O + C = CO + H_2$$

Coke and electric energy are consumed when the moisture is reduced. Although some of the moisture may be evaporated without reduction, little water vapor can be tolerated in the furnace gas because phosphorus vapor is condensed by adiabatic cooling from contact of the dry gases with water. The combustible gases—carbon monoxide and hydrogen—are normally used as fuel to nodulize or calcine phosphatic feedstock. Anhydrous or nearly anhydrous phosphatic feedstock is needed when elemental phosphorus is produced.

Example V includes claim 1 in U.S. Pat. No. 4,968,499. Agglomerates containing monocalcium phosphate monohydrate are indurated in step (b) at a temperature of 220 to 1832 degrees F. Since the minimum temperature is 220 degrees F. and is 8 degrees above the boiling point of water anhydrous or nearly anhydrous feedstock is assured.

Example III gives results of TVA's heating monocalcium phosphate monohydrate over the range 392° F. to 1292° F. Heating to 392° F. drove off, or volatilized, 2 of the 3 moles of water in $CaO.P_2O_5.3H_2O$ and heating to 1292° F. volatilized all three moles of water. When all three moles of water are volatilized monocalcium phosphate is converted to calcium metaphosphate ($CaO \cdot P_2O_5$). The energy required to volatilize combined water will be substantially greater than the energy required to evaporate moisture. However, smelting one, two, or three moles of water will generate carbon monoxide and hydrogen which can be burned in a combined cycle electric generating facility. An overall thermal efficiency of about 75 percent can be attained and the net electric energy for reduction of water is lessened. In the present invention a choice can be made to volatilize zero, one, two, or , three moles of water.

EXAMPLE VIII

The present invention entails preparation of monocalcium phosphate monohydrate by the process used at TVA to manufacture concentrated superphosphate fertilizer. Chemical Engineering Report No. 5 and a book, "Superphosphate: Its History, Chemistry, and Manufacture", United States Department of Agriculture and Tennessee Valley Authority, December 1964 provide detailed technical information on the manufacture of concentrated superphosphate fertilizer. For manufacture of the fertilizer a monolithic mass of material is prepared and for preparation of feedstock this mass is broken into lumps having a size suitable for smelting. The average size and the size distribution of the lumps are to be similar to the average size and size distribution of the reducing carbon. Lumps are to be heated for hardening, drying, and volatilization of combined water. Anhydrous lumps will contain about 51 percent $P_2O_5$. The percent $P_2O_5$ will increase to 64 percent if all the moisture and combined water are volatilized.

Polluted soil is agglomerated by nodulizing whereby soil is heated to high temperatures as described in "Agglomeration of Phosphate Fines For Furnace Use", Stout, E. L., Tennessee Valley Authority, Chemical Engineering Report No. 4,1950. Lumps are formed which have an average particle size and a size distribution that was found suitable for smelting at TVA.

Nodulized washed sand was a satisfactory feedstock at TVA and table 1 shows nodules contained 27.5 percent $P_2O_5$. In the present invention the two feedstocks— indurated monocalcium phosphate monohydrate and nodulized soil—are combined to form a mixture containing about 27.5 percent $P_2O_5$. A carbon-containing material is added to chemically reduce $P_2O_5$, $Fe_2O_3$, and $H_2O$.

When nodulized washed sand was smelted at TVA silica rock was added to obtain slag having a $SiO_2/CaO$ weight ratio of 0.80. The combined feedstocks may have a $SiO_2/CaO$ weight ratio of 0.80, or greater, and addition will not be needed. However, silica rock can be added if the $SiO_2/CaO$ weight ratio of the combined feedstocks is less than 0.80.

Smelting the materials in an electric furnace yield the following products; elemental phosphorus, ferrophosphorus, and carbon monoxide. Calcium silicate slag is formed and contacting the molten material with jets of water makes granulated slag which can be applied on agricultural land as a liming agent. If the feedstock contains water as moisture or combined water hydrogen will be another product. The hydrogen together with the carbon monoxide can be burned in a combined cycle facility to generate electric energy.

Having thus described the invention, the following is claimed:

1. A process for the remediation of soil polluted with elemental phosphorus, said process comprising the following steps:

(a) agglomerating soil collected from a polluted site by nodulizing to form lumps;

(b) reacting in a separate operation by contact in a mixer phosphoric acid and ground phosphate ore to form a slurry containing monocalcium phosphate monohydrate;

(c) depositing said slurry on a conveyor belt to produce a porous monolithic mass containing monocalcium phosphate monohydrate;

(d) conveying said monolithic mass to a breaker to disintegrate the mass into lumps;

(e) indurating the disintegrated lumps by heating at a temperature in the range of 220° to 1300° F. to produce dehydrated monocalcium phosphate lumps;

(f) combining the nodulized lumps of soil, the indurated lumps of monocalcium phosphate, and carbon to obtain a solid mixture;

(g) feeding said mixture to an electric furnace and smelting it to produce calcium silicate slag, ferrophosphorus, elemental phosphorus, and carbon monoxide; and (h) redepositing the calcium silicate slag furnace product at the site.

2. The process of claim 1 wherein the elemental phosphorus content of said polluted soil ranges from detectable by chemical analyses to 0.3 percent.

3. The process of claim 1 wherein said phosphoric acid and said ground phosphate ore are contacted in a cone mixer.

4. The process of claim 1 wherein anhydrous monocalcium phosphate is formed by the induration operation of step (e).

5. The process of claim 1 wherein moisture and one mole of combined water in monocalcium phosphate monohydrate are volitilized by the induration operation of step (e).

6. The process of claim 1 wherein moisture and two moles of combined water in monocalcium phosphate monohydrate are volitilized by the induration operation of step (e).

7. The process of claim 1 wherein said monocalcium phosphate monohydrate is converted to calcium metaphosphate during the heating operation of step (e).

8. The process of claim 1 wherein said solid mixture fed to said furnace also includes silica rock.

9. The process of claim 1 wherein said smelting produces hydrogen in addition to calcium silicate slag, ferrophosphorus, elemental phosphorus and carbon monoxide.

* * * * *